United States Patent Office 3,522,066
Patented July 28, 1970

3,522,066
PROCESS FOR PREPARING AQUEOUS MIXED LITHIUM AND SODIUM (AND/OR POTASSIUM) SILICATE SOLUTIONS
Marvin Wayne Forsyth, Cedar Rapids, Iowa, assignor to Lithium Corporation of America, Inc., New York, N.Y., a corporation of Minnesota
No Drawing. Filed Dec. 6, 1966, Ser. No. 599,410
Int. Cl. C09d 1/02
U.S. Cl. 106—74        5 Claims

ABSTRACT OF THE DISCLOSURE

Process of preparing aqueous lithium silicate-sodium and/or potassium silicate solutions by admixing an aqueous solution of sodium silicate and/or potassium silicate with an acid-washed silica hydrogel and lithium hydroxide, and agitating the mixture.

---

This invention is directed to a novel and advantageous process for preparing aqueous mixed lithium-sodium (and/or potassium) silicate solutions. The invention will be described hereafter in regard to the production of mixed lithium and sodium silicate solutions, but it will be understood that it is applicable to the production of mixed lithium-potassium silicate solutions or mixed lithium-sodium-potassium silicate solutions.

Aqueous mixed lithium and sodium silicate solutions have heretofore been produced by a variety of procedures and such solutions have been suggested for use for various purposes, notably as protective coating compositions for metallic surfaces, as disclosed in U.S. Pat. Nos. 2,440,969; 3,130,061 and 3,180,746. The preparation of aqueous mixed lithium and sodium silicate solutions, particularly for use in the production of coating compositions for metallic surfaces, is attended with numbers of problems. Various processes which have been suggested are somewhat cumbersome, and others require the use of elevated temperatures with or without elevated pressures. Moreover, the properties of the resulting lithium-sodium silicate solution are frequently markedly influenced by the processes involved in their preparation, including the source material from which the lithium is derived.

In general, as disclosed in various of the above listed patents, lithium-sodium silicate solutions have been prepared from alkali (NaOH or KOH) stabilized colloidal silicas or silica sols by admixing lithium hydroxide therewith; or by reacting a silica gel with lithium hydroxide and sodium hydroxide in an aqueous medium at temperatures in the range of 75 to 150 degrees C., especially under superatmospheric pressures. The former procedure, among other aspects, requires the use of expensive starting materials. The latter procedure is cumbersome, particularly when carried out under superatmospheric pressures. When various other sources of silica are sought to be utilized for the production of aqueous solutions of lithium-sodium silicates, severe problems are encountered. Thus, so-called arc silicas (when sought to be reacted with lithium hydroxide and sodium hydroxide in an aqueous medium, are substantially unreactive. When fume silicas are reacted with lithium hydroxide and sodium hydroxide in aqeous media, marked difficulties are encountered, substantial thickening occurring which substantially interferes with mixing and with the reaction, which is not appreciably alleviated even by the addition of excess amounts of water but within reasonable limits as, for instance, to yield reaction mixtures containing 10% total solids. Again efforts to use precipitated silicas have proven unsatisfactory because reaction mixtures therewith of lithium hydroxide and sodium hydroxide in aqueous media contain considerable quantities of insolubles which settle out very inadequately and cause difficult filtration problems. Amorphous and crystalline high purity sands likewise are unsatisfactory since they are substantially unreactive with mixtuers of lithium hydroxide and sodium hydroxide in aqueous media even at temperatures of the order of 100 degrees C. in sealed containers.

I have discovered that certain silica hydrogels, of the type mentioned hereafter, react quite readily with mixtures of lithium hydroxide and sodium hydroxide in aqueous media, even at ambient or room temperatures and at atmospheric pressure, to produce lithium-sodium silicate solutions. I have further found that such aqueous lithium-sodium silicate solutions are effective for use as metal coatings, notably ferrous metal coatings, or protectants, and that they lend themselves well to the incorporation of finely divided metals, such as zinc and aluminum, and other additions to provide special protective coating and impregnating compositions.

Silica hydrogels are sharply distinguishable from silica gels and, if anything, even more so from other forms of silica such as have been mentioned above. Silica gels are surface-active highly porous materials, whereas silica hydrogels are essentially non-surface-active and are devoid or substantially devoid of porosity. Silica gels generally contain only up to about 6% water, considered to be in bound form. Silica hydrogels, on the other hand, are essentially completely hydroxylated, containing both free water and hydrogen-bonded water. Silica hydrogels are intermediate products in the production of silica gels, said hydrogels being formed in the first precipitation step in the manufacture of silica gels.

Generally speaking, there are two types of silica hydrogels. One type is an acid-washed product; and the other type is an alkali washed product, generally involving an ammoniacal wash solution. It has been found that, for the purposes of my present invention, only the acid-washed silica hydrogels are satisfactory to produce the aqueous mixed lithium and sodium silicate solutions. An acid-washed silica hydrogel which has been found to be particularly advantageous for use in the practice of my invention is that sold under the designation SMR–1–35 (W. R. Grace Company), said silica hydrogel passing 100 mesh and having an $SiO_2$ content of about 31.4%. Generally speaking, the $SiO_2$ contents of such acid-washed silica hydrogels vary from about 28 to about 35% $SiO_2$, the remainder being volatile matter.

The silicate solutions of my present invention are most advantageously produced by admixing the acid-washed silica hydrogel, which is a solid, with a water solution of water glass or sodium silicate at ambient temperature and pressure, adding lithium hydroxide, preferably lithium hydroxide monohydrate, with stirring, and then filtering. If desired, the temperature may be somewhat higher or somewhat lower as, for instance, 15 degrees C., but, for best results, it should not substantially exceed about 50 degrees C. The reaction is exothermic but no extraneous cooling is required. A preferred temperature range is 20 to 30 degrees C. At reaction temperatures appreciably higher than 50 degrees C., precipitates form which, however, at least in the main, go back into solution on cooling to room temperature. While superatmospheric pressures can be used, no particular advantages result and, indeed, it is distinctly advantageous to avoid the same.

The order of mixing the aforementioned ingredients is important. The sodium silicate solution and the silica hydrogel are first intermixed as a result of which some of the silica hydrogel interacts. Then the lithium hydroxide is added. If the lithium hydroxide is first admixed with the sodium silicate solution, and then the silica hydrogel is added, undesirable precipitation of insoluble material occurs. However, the lithium hydroxide and the silica hydrogel may first be admixed together, advantageously with a small amount of water, and then added to the sodium silicate solution, with stirring. It will be noted that, in the production of the aqueous solutions of the mixed lithium and sodium silicates pursuant to my invention, the sodium silicate functions as a solvent in which the lithium silicate is produced.

The relative proportions of the acid-washed silica hydrogel, the lithium silicate, and the sodium hydroxide utilized are variable within rather wide limits. Generally speaking, the mole ratios may be similar to those disclosed in the aforesaid Pat. Nos. 3,130,061 and 3,180,746 as, for instance, in the latter patent, a mole ratio of $$Li_2O/M_2O/SiO_2$$

of about 0.75 to 1 of $Li_2O$, 0.05 to 0.25 of $M_2O$, and 2.5 to 5 of $SiO_2$, where M is Na and/or K. It is preferred to prepare solutions in which the mole ratio of $Li_2O/M_2O$ is in the range between about 2.5 to 3.5 of $Li_2O$ to 1 of $M_2O$ and in which the mole ratio of $SiO_2$/total of $Li_2O$ and $M_2O$ is in the range of about 3.3 to 5.2 of $SiO_2$ to 1 of the total of $Li_2O$ and $M_2O$. In terms of weight basis, it is preferred that the aqueous solutions made pursuant to the present invention contain from about 1.5 to 2% of $Li_2O$, from about 1 to 1.5% of $M_2O$, and from about 15 to 25% $SiO_2$. For commercial and other reasons, it is especially preferred to produce aqueous solutions containing lithium silicate and sodium silicate, and, hence, wherein M is Na.

The concentrations of lithium silicate and sodium and/or potassium silicate in the aqueous solutions thereof produced in accordance with my invention are variable. Generally speaking, for commercial reasons, it will usually not be desirable to produce aqueous solutions of less than about 10% content of a total of said silicates and, ordinarily, it will be desirable to produce aqueous solutions containing above 15% and, better still, about 20 to about 25% solutions, although appreciably higher concentrations can be produced if desired for any particular purposes.

The following example is illustrative of the practice of the invention and is not to be construed in any way as limitative of the scope of the invention since various changes or modifications can be made in the light of the guiding principles and teachings set forth above.

EXAMPLE 400 g. of sodium silicate solution (Moreland Chemical Company, Grade 42, 8.7% $Na_2O$, 28.4% $SiO_2$) were diluted with 1000 cc. water. Then 1,400 g. of hydrogel SMR-1-35 (30% $SiO_2$) (W. R. Grace Company) were added to the sodium silicate solution with mechanical stirring and, after about 30 minutes, 156 g. of lithium hydroxide monohydrate (56.6% LiOH) were added slowly over about 2 minutes. Within 2 hours, all solids appeared to be in solution. The solution was filtered through glass filter paper. The clear filtrate analyzed 1.84% $LiO_2$, 1.17% $Na_2O$, and 17.9% $SiO_2$, giving a molar ratio $Li_2O:Na_2O:SiO_2$ of 0.766:0.234:3.77, or, approximately, a molar ratio $Li_2O:Na_2O:SiO_2$ of 1:0.33:5.

The aqueous silicate solutions produced in accordance with my invention when heated to somewhat elevated temperatures, for instance 95 degrees C., and then allowed to cool to room temperature, undergo some precipitation, generally at about 85 degrees C., most of the precipitated material going back into solution on further cooling. No significant analytical changes have been observed. Furthermore, such heating and cooling of my silicate solutions does not appear materially to affect them as coating compositions for metallic surfaces or as impregnating compositions.

As indicated previously, various additions can be made to the aqueous silicate solutions in order to obtain special effects, if desired. These include finely divided metals such as are disclosed in the aforementioned U.S. Pat. Nos. 2,440,969; 3,130,061 and 3,180,746 as well as casein, clay, aluminates, borax and numerous other additives or supplemental materials such as are disclosed in said patents.

For convenience, the sodium and/or potassium silicates are referred to in the claims as M silicates where M is a member of the group consisting of sodium and potassium.

I claim:
1. A process for the production of aqueous solutions containing a total of about 10 to about 25% of a mixture of (a) lithium silicate and (b) at least one M silicate where M is a member of the group consisting of sodium and potassium, which comprises first admixing an aqueous M silicate solution with an acid-washed silica hydrogel and then admixing lithium hydroxide therewith, to effect reaction to produce lithium-M silicate solutions, said reaction being effected at a temperature not substantially exceeding 50 degrees C., the M silicate, acid-washed silica hydrogel and lithium hydroxide being used in amounts such as to provide a mole ratio of $Li_2O/M_2O/SiO_2$ in the lithium-M silicate in said aqueous solutions in the range of about 0.75 to 1 of $Li_2O$, about 0.05 to 0.25 of $M_2O$, and about 2.5 to 5 of $SiO_2$.

2. A process according to claim 1 wherein the silica hydrogel contains from about 28 to 35% $SiO_2$.

3. A process according to claim 1 wherein the reaction is carried out at a temperature in the range of 20 to 30 degrees C.

4. A process according to claim 1, wherein M is Na and wherein the mole ratio of $Li_2O/Na_2O$ is in the range of about 2.5 to 3.5 of $Li_2O$ to 1 of $Na_2O$, and in which the mole ratio of $SiO_2$/total of $Li_2O$ and $Na_2O$ is in the range of about 3.3 to 5.2 of $SiO_2$ to 1 of the total of $Li_2O$ and $Na_2O$.

5. A process for the production of aqueous solutions containing a total of about 10 to about 25% of a mixture of (a) lithium silicate and (b) at least one M silicate where M is a member of the group consisting of sodium and potassium, which comprises first admixing together an acid-washed silica hydrogel and lithium hydroxide, and then admixing therewith said M silicate in aqueous solution to effect reaction to produce lithium-M silicate solutions, said reaction being effected at a temperature not substantially exceeding 50 degrees C., the acid-washed silica hydrogel, lithium hydroxide and M silicate being used in amounts such as to provide a mole ratio of $Li_2O/M_2O/SiO_2$ in the lithium-M silicate in said aqueous solutions in the range of about 0.75 to 1 of $Li_2O$, about 0.05 to 0.25 of $M_2O$, and about 2.5 to 5 of $SiO_2$.

References Cited

UNITED STATES PATENTS

| | | | |
|---|---|---|---|
| 3,180,746 | 4/1965 | Patton et al. | 106—74 |
| 3,392,039 | 7/1968 | Cuneo | 106—74 |

JAMES E. POER, Primary Examiner

U.S. Cl. X.R.

106—84